United States Patent [19]
Whitefield

[11] 4,290,672
[45] Sep. 22, 1981

[54] PLURAL LINE ACOUSTO-OPTICALLY MODULATED LASER SCANNING SYSTEM

[75] Inventor: Rodney J. Whitefield, San Jose, Calif.

[73] Assignee: International Business Machines Corporation, Armonk, N.Y.

[21] Appl. No.: 53,466

[22] Filed: Jun. 29, 1979

[51] Int. Cl.³ .............................................. G02F 1/11
[52] U.S. Cl. ................................................ 350/358
[58] Field of Search ............................ 346/1, 49, 108; 350/358

[56] References Cited

U.S. PATENT DOCUMENTS

| | | | |
|---|---|---|---|
| 3,627,405 | 12/1971 | Feldman et al. | 350/358 |
| 3,882,273 | 5/1975 | Knox | 350/358 |
| 3,900,851 | 8/1975 | Bucy et al. | 346/49 |
| 3,935,566 | 1/1976 | Snopko | 350/358 |
| 4,000,493 | 12/1976 | Spaulding et al. | 346/1 |
| 4,053,898 | 10/1977 | Hirayama et al. | 346/1 |
| 4,084,182 | 4/1978 | Maiman | 350/358 |

OTHER PUBLICATIONS

Chu et al., Bragg Diffraction of Light by Two Orthogonal Ultrasonic Waves in Water, Appl. Phys. Lett., vol. 22, No. 11, (Jun. 1, 1973), pp. 557–559.
Farmer et al., Two-Component, Self-Aligning Laser Vector Velocimeter, Applied Optics, vol. 12, No. 11, (Nov. 1973), pp. 2636–2640.
Mertens, On the Theory of the Diffraction of Light by Two Parallel Ultrasonic Waves . . ., Zeitschrift fur Physik, vol. 160, (1960), pp. 291–296.
Ohtsuka, Sound Velocity Measurement Based on Optical Heterodyne Detection Techniques Using Two Successive Ultrasonic Waves, J. Phys., Sci. Instr., vol. 6, (1973).

*Primary Examiner*—William L. Sikes
*Attorney, Agent, or Firm*—George E. Roush

[57] ABSTRACT

Unwanted interference effects arising in those high speed laser scanning systems, particularly those used in printing, employing an acousto-optical modulator for scanning with a plurality of focussed beams simultaneously in order to reduce the required deflection scan rate, and to better the rise and fall times of the waveforms, are largely eliminated by arranging a pair of Bragg deflection cells one behind the other with the directions of propagation of the acoustic waves in the cells substantially 90 degrees apart with respect to each other. The undeflected beam of light is projected onto the cells at the Bragg angles for both cells. Substantially, the same results obtain as though a single Bragg cell were used but devoid of acoustical interference effects.

6 Claims, 5 Drawing Figures

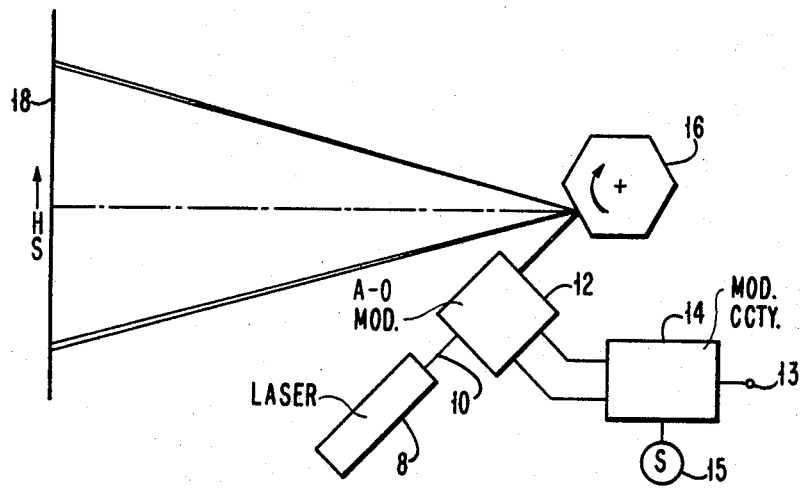
FIG. 1
$(1,\emptyset)$ ⊕ ← $(1,1)$
$(\emptyset,\emptyset)$ → ⊕ $(\emptyset,1)$
FIG. 5
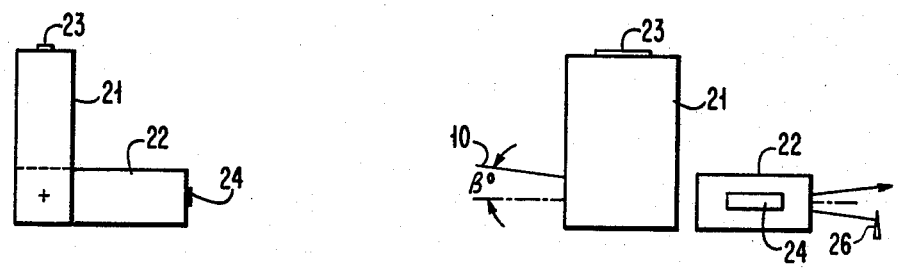
FIG. 2  FIG. 3
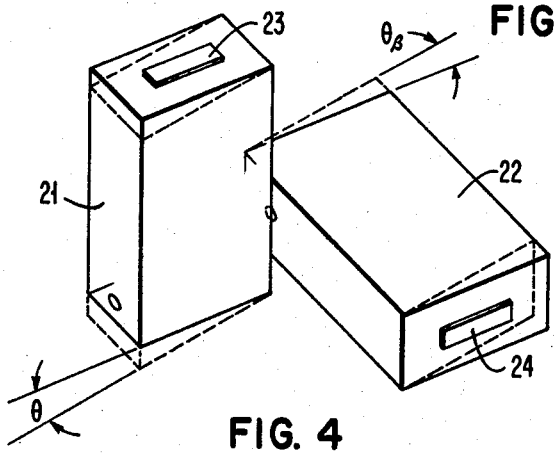
FIG. 4

PLURAL LINE ACOUSTO-OPTICALLY MODULATED LASER SCANNING SYSTEM

FIELD OF THE INVENTION

The invention relates to acousto-optically modulated laser scanning systems, and it particularly pertains to such systems wherein a laser beam is bistatically modulated by a pair of acousto-optical modulating devices for creating a paired line arrangement for scanning a spot-sequential raster type image pattern.

BACKGROUND

Broadly, acousto-optically modulated laser beam scanning systems, particularly raster scanning systems, are old, and several satisfactory system arrangements are known. As the art progresses, however, the increasing demands relative to speed, resolution and registration, together with the demands on impact printing, paper toning and fusing, bring about some rather difficult problems in advancing the art. Wherever possible, it is highly desirable that conventional methods and conventional apparatus be used, if for no other reason than these methods and this apparatus has individually proven its worth in past performance.

PRIOR ART

In many very high speed laser scanning systems, particularly in those used in printing, arrangements are known for scanning with two or more focussed beams simultaneously in order to reduce the scan rate required of the deflection apparatus and to decrease the required rise and fall times of the modulation waves that activate the apparatus. This is sometimes accomplished with acousto-optical modulating apparatus excited at one or more carrier frequencies in order to provide the necessary individually modulatable, noncoincident beams.

In such an acousto-optically modulated raster scanning system of the type wherein a laser beam is deflected in one direction by opto-mechanical apparatus and deflected in the normal direction and intensity modulated by acousto-optical modulating apparatus operating at the same or two or more different carrier frequencies simultaneously, any attempt to meet increased demands usually results in undesirable intermodulation products. Novel techniques, together with corresponding novel arrangements of apparatus, will be described more completely hereinafter following a short discussion of prior art systems and prior art apparatus having component apparatus and/or subsystem operation, as shown and described in the prior art, particularly that represented by the disclosures in the hereinbefore mentioned copending U.S. Patent applications and in the following U.S. Pat. Nos.:

| 3,882,273 | 5/1975 | Knox | 350/161W |
| 3,900,851 | 8/1975 | Bucy et al | 346/49 |
| 4,000,493 | 12/1976 | Spaulding et al | 346/1 |
| 4,053,898 | 10/1977 | Hirayama et al | 346/1 |

And published in the literature:

W. P. Chu and L. E. Mauldin; "Bragg Diffraction of Light by Two Orthogonal Ultrasonic Waves in Water"; Applied Physics Letters, Volume 22, pp 557–9, June 1973;

Farmer and Hornkohl "Two Component, Self Analyzing Laser Velocimeter"; Applied Optics Volume 12; pp 2636–40, November 1973.

R. Mertens: "On the Theory of the Diffraction of Light by two Parallel Ultrasonic Waves, one being the nth Harmonic of the Other"; Zeitschrift fur Physik 160; pp 291–6; 1960.

Y. Ohtsuka "Sound Velocity Measurement based on Optical Heterodyne Detection Techniques Using two Successive Ultrasonic Waves"; Journal of Physics: Scientific Instruments; Vol 6; 1973.

The patents disclose systems and apparatus for producing a raster scan type image display with acousto-optical laser beam scanning apparatus, but none of them deal with the spatial problem to which the apparatus according to the invention is directed, and therefore do not suggest the apparatus according to the invention.

The publications are directed to similar component acousto-optical apparatus, including Bragg deflection cells excited acoustically in two dimensions parallel or normal to each other and also normal to the axis of a laser beam, but the disclosures fall far short of the novel scanning system according to the invention.

SUMMARY OF THE INVENTION

The objects of the invention indirectly referred to hereinbefore, and those that will appear as the specification progresses, are attained in a simple system comprising a laser for generating a beam of coherent light, acousto-optical modulating apparatus arranged for receiving the laser beam and deflecting it into two or more individually modulated beams propagating in different directions, deflecting apparatus, for example a rotating mirror, arranged for receiving the modulated laser beams and deflecting them in a direction normal to the one direction, and a plane or cylindrical surface element on which the beams impinge in a sequential multiple dot matrix raster scan pattern.

According to the invention, the beam from the laser is passed through the electro-acousto-optical cells in series to form image light spots in a pair of adjacent scanned lines in a raster. The pairs of light spots are individually blended in accordance with data representing the lines displayed wherein the acousto-optical modulating apparatus cells are arranged at 90° to each other about the axis of the laser beam whereby the spot (or a major portion of the spot) on one line leads (or lags) the spot (or the major portion of the spot) on the succeeding line to reduce the number of scans necessary and better the performance as well.

DRAWING

In order that full advantage of the invention obtain in practice, the best mode embodiment thereof, given by way of example only, is described in detail hereinafter with reference to the accompanying drawing, forming a part of the specification, and in which:

FIG. 1 is a functional diagram of basic scanning apparatus in which the invention is applicable;

FIGS. 2 and 3 are elevation and end views of a pair of Bragg cells as arranged in accordance with the invention;

FIG. 4 is an isometric view of the Bragg cells as arranged according to the invention illustrating the manner in which a laser beam is applied and deflected by the apparatus according to the invention; and FIG. 5 is a schematic diagram illustrating the manner of deflection of the modulated laser beam in apparatus according to the invention.

DESCRIPTION OF BASIC APPARATUS

A basic scanning system in which the principles of the invention are applied is shown in FIG. 1. Laser apparatus 8 is arranged to deliver a beam of coherent light through acousto-optical modulating apparatus 12 where it is modulated in response to binary data applied at input terminals 13 for operation of modulating circuitry 14 to which an acoustical frequency wave from a source 15 is applied. This modulation serves to produce two bistatic spot-sequential image bearing beams and projected onto rotating mirror apparatus 16 of conventional construction. The rotating mirror 16 scans the two beams horizontally across a cylindrical drum of radius of revolution large with respect to line plane surface 18, while vertical separation of the scanning lines over the image area is effected by lateral movement of the plane surface element or by rotation of the drum. Acousto-optical modulator apparatus 12 provides the two or more spots and spaced the required distance for simultaneous multiple scanning of the cylindrical surface element 18. The cylindrical surface element 18 in one application is a photoconductive drum for a photo-printing machine and the like. It is clearly understood that the arrangement as shown has synchronizing apparatus omitted for clarity inasmuch as such, in and of itself, is not a part of the invention, and that those skilled in the art will have the necessary means at hand for synchronizing the apparatus in known manner in at least one of many forms available.

DESCRIPTION OF MODULATING APPARATUS

According to the invention the acousto-optical modulator apparatus 12 comprises a pair 21,22 of Bragg cells arranged as shown in an elevation view in FIG. 2, and in an end view in FIG. 3, and again in an isometric view in FIG. 4. The cells 21,22 are preferably of crystalline lead- or plumbium-molybdate, or $PbMoO_4$. Other suitable acousto-optic modulator material is tellurium dioxide, $TeO_2$, and tellurium glass. For a modulating frequency range of 70 to 120 MHz, the crystals are 5 mm×10 mm×15 mm with an electro-acousto transducer 23,24 arranged on one of the 5×10 mm faces. The cells are spaced apart one behind the other with the axes of the acoustic wave propagation at 90° with respect to each other. The spacing between the cells need be no more than sufficiently large as to prevent touching when excited, but successful operation has been obtained with as much as 150 mm spacing with excellent results at 20 mm spacing as determined by the mounting arrangements for one pair of cells used in tests. The light beam 10 is directed onto the first cell 21 at the proper Bragg angle for that cell and sumultaneously at the proper Bragg angle for the other cell 22 as will be described. At 110 MHz the Bragg angle is of the order of 8.5 milliradians.

In operation, the acoustic power levels are adjusted so as to achieve various divisions of power between the zeroth (0) and Bragg deflected order. A power P1 is defined as that corresponding to the power of maximum deflection efficiency into the Bragg deflected order. This amount of power will be considered as defining the unit of optical intensity $$I_1 = \frac{I_{deflected}}{I_0},$$

where $I_0$ is the incident undeflected intensity. $P=\frac{1}{4}$ will be the acoustic power level which deflects an intensity $I_1$ ($\frac{1}{4}$).

Power will be deflected in most cases into higher orders, but most of the energy will be either in the undeflected or Bragg deflected orders. The (0,0) incident beam direction is such that the Bragg deflected beams lie in the +1 diffracted orders. Defined pictorially as in FIG. 5, after separation by propagation due to their angular divergence these are:

(0,0) undeflected beam 1;
(1,0) Bragg deflected in modulator 21, undeflected in modulator 22;
(0,1) undeflected in modulator 21, Bragg deflected in modulator 22; and
(1,1) Bragg deflected in modulator 21, Bragg deflected in modulator 22.

On a screen placed sufficiently far from the deflectors that beam overlap would not occur, the centers of the beam are displayed as shown in FIG. 5. For these intensities a simplified deflection table in terms of the acoustic power levels is given below. In the simplified table $P_{\frac{1}{4}}$ neglects the effect of reverse transitions to the (0,0) order and higher order deflections. In practice the power required will exceed $P_1 = \frac{1}{4}$ for the single beam deflection case by an amount dependent upon these effects by a function of $\delta > 1$. Other tables of acoustic power levels in terms of beam intensities are possible.

TABLE I

| Acoustic Power Levels | $P_1 = 0$ $P_2 = 0$ | $P_1 = \frac{1}{4}$ $P_2 = 0$ | $P_1 = 0$ $P_2 = \frac{1}{4}$ | $P_1 = \frac{1}{4}(\delta)$ $P_2 = \frac{1}{4}(\delta)$ |
|---|---|---|---|---|
| Beam Designations | | Beam Intensities | | |
| (0,0) | 1 | $\frac{3}{4}$ | $\frac{3}{4}$ | $\frac{1}{4}$ |
| (1,0) | 0 | $\frac{1}{4}$ | 0 | $\frac{1}{4}$ |
| (0,1) | 0 | 0 | $\frac{1}{4}$ | $\frac{1}{4}$ |
| (1,1) | 0 | 0 | 0 | $\frac{1}{4}$ |

If a stop, knife edge, or a slit is arranged to pass only the (0,1) and (1,0) beams, three power levels for $P_1$ and three power levels for $P_2$ are sufficient to amplitude modulate the two selected beams off and on.

The beams will appear to diverge from the same plane along the (0,0) axis but laterally displaced from it. In order to obtain fast rise times for beam deflection in Bragg acousto-optical modulators, the incident beam is typically focussed so as to reduce the beam diameter and the waist is located in the modulators so as to produce the fastest rise time. For the configuration described here, the two orthogonally oriented devices 21,22 for shortest and balanced rise times would be located equally displaced about the beam waist. As the apparent deflection does not take place at the beam waist, the apparent source of the beam waist is displaced in the plane located at the beam waist of the (0,0) beam and which is perpendicular to that beam. The apparent displacement is $$D_{sin}(2\theta_\beta),$$

where D is the optical path length separation between the waist and the apparent center of deflection in the individual modulator.

Measurements made on Isomet 1206-1 Bragg modulators at 96 MHz using a 150 mm converging lens indicate displacements of the modulator from the beam waist by 1.27 cm (0.5 in) reduces the (deflection efficiency/rise time) from 87%/24 NS to approximately 87%/28 NS.

As the modulator element length is 1.63 cm (0.64 in), this verifies that the two device configuration does not require an unacceptable increase in rise time or decrease in efficiency if the two modulators are symmetrically displaced in front of and behind the beam waist.

For operation, the incident beam (0,0) must satisfy the Bragg condition for both acoustic waves. The (0,0) beam is defined as the Z axis which then requires that the orthogonally arranged devices 21,22 be tipped at some angle with respect to the Z axis. This condition can easily be written in a single orthogonally excited device where the two acoustic propagation vectors define a plane, and where simplicity equal acoustic wavelengths are assumed.

The normal to the plane $\hat{N}$ should be tipped so as it and the Z axis define another plane containing $\hat{Z}$ axis and bisecting the angle between $\bar{v}_1$ and $\bar{v}_2$. Defining the angle between the $\hat{Z}$ axis and the normal $\hat{N}$ as $\delta$, the Bragg condition requires $(\sin \delta)(\cos [45°]) = \sin \theta_{62}$. Similar considerations apply for the two device configuration and for non-equal acoustic wavelengths.

While the invention has been described in terms of an express embodiment, and different arrangements have been suggested, it clearly should be understood that those skilled in the art will make changes as required for the application at hand without departing from the spirit and scope of the invention as defined in the appended claims concluding the specifications.

The invention claimed is:

1. A plural line acousto-optically modulated scanning system of the type wherein a light beam is deflected by acousto-optical modulating apparatus in one direction, and in another direction by deflecting apparatus for creating a dot sequential raster image display in a plurality of pairs of scan lines, comprising
    apparatus for generating a beam of light,
    light deflecting apparatus intercepting light from said generating apparatus for scanning said raster substantially simultaneously in at least one pair of scan lines for creating said image display,
    acousto-optical modulating apparatus interposed between said light generating apparatus and said light deflecting apparatus for producing a plurality of individually modulatable scanning beams,
    said modulating apparatus comprising
    apparatus for propagating a pair of acoustic waves in directions substantially normal to the path of said beam of light but offset by the Bragg angle and also normal with respect to each other, and
    apparatus for individually modulating each of said waves in accordance with data representative of the image to be displayed.

2. A plural line acousto-optically modulated scanning system as defined in claim 1, and wherein
    said acoustic wave propagating apparatus comprises two Bragg acousto-optical deflection cells spaced apart one behind the other.

3. A plural line acousto-optically modulated scanning system as defined in claim 2, and incorporating
    a light stop arranged in the path of the zero order beam beyond the second Bragg cell.

4. A plural line acousto-optically modulated scanning system as defined in claim 3, and wherein
    said light stop has a knife edge.

5. A plural line acousto-optically modulated scanning system of the type wherein a laser beam is deflected by acousto-optical modulating apparatus in one direction, and in another direction by deflecting apparatus for creating a dot sequential raster image display in a plurality of pairs of scan lines, comprising
    laser apparatus for generating a beam of coherent light,
    light deflecting apparatus intercepting light from said laser apparatus for scanning said display in at least a pair of lines for creating an image raster,
    acousto-optical modulating apparatus interposed between said laser apparatus and said deflecting apparatus for producing a plurality of individually modulatable scanning beams,
    said modulating apparatus comprising
    two Bragg acousto-optical deflection cells each having an electro-acoustic wave transducer on one face thereof for propagating an acoustic wave in a given direction therein and another face optically transparent and parallel to said given direction,
    said cells being arranged in said laser beam with said other faces normal thereto save for an offset of the Bragg angle and one cell behind the other with the directions of propagation of said acoustic waves in the cells normal to each other, and
    circuitry connected to the transducers of said cells and arranged for modulating said laser beam of light to form a pair of beams of sequentially appearing raster image pattern spots.

6. A plural line acousto-optically modulated scanning system as in claim 5, and wherein
    said light deflecting apparatus is a multi-faceted rotating mirror assembly.

* * * * *

UNITED STATES PATENT AND TRADEMARK OFFICE
CERTIFICATE OF CORRECTION

PATENT NO. : 4,290,672
DATED : September 22, 1981
INVENTOR(S) : Rodney J. Whitefield It is certified that error appears in the above—identified patent and that said Letters Patent is hereby corrected as shown below:

Column 5, line 24, for "Sin $\Theta_{62}$" read --Sin $\Theta_\beta$--

Signed and Sealed this

First Day of December 1981

[SEAL]

Attest:

GERALD J. MOSSINGHOFF

Attesting Officer        Commissioner of Patents and Trademarks